(12) United States Patent
Wickham et al.

(10) Patent No.: US 9,733,633 B2
(45) Date of Patent: Aug. 15, 2017

(54) METHOD AND SYSTEM FOR ORDER FULFILLMENT

(71) Applicant: Flextronics AP, LLC, San Jose, CA (US)

(72) Inventors: Brian F. Wickham, Piacenza (IT); Marco Minella, Rome (IT)

(73) Assignee: Flextronics AP, LLC, San Jose, CA (US)

( * ) Notice: Subject to any disclaimer, the term of this patent is extended or adjusted under 35 U.S.C. 154(b) by 114 days.

(21) Appl. No.: 14/459,558

(22) Filed: Aug. 14, 2014

(65) Prior Publication Data

US 2015/0307278 A1    Oct. 29, 2015

Related U.S. Application Data

(60) Provisional application No. 61/985,957, filed on Apr. 29, 2014, provisional application No. 62/028,191, filed on Jul. 23, 2014.

(51) Int. Cl.
| | |
|---|---|
| *G03B 15/02* | (2006.01) |
| *G05B 15/02* | (2006.01) |
| *G05B 13/04* | (2006.01) |
| *G05B 15/00* | (2006.01) |

(52) U.S. Cl.
CPC .......... *G05B 15/02* (2013.01); *G05B 13/041* (2013.01); *G05B 13/047* (2013.01); *G05B 15/00* (2013.01)

(58) Field of Classification Search
CPC ...... G05B 15/02; G05B 15/00; G05B 13/041; G05B 13/047
See application file for complete search history.

(56) References Cited

U.S. PATENT DOCUMENTS

| | | | | |
|---|---|---|---|---|
| 5,395,206 A | * | 3/1995 | Cerny, Jr. ........... | B65G 1/1378 414/270 |
| 5,854,750 A | * | 12/1998 | Phillips .................. | G06F 9/466 700/216 |
| 6,061,607 A | * | 5/2000 | Bradley .............. | B65G 1/1376 414/273 |
| 6,289,260 B1 | * | 9/2001 | Bradley .............. | B65G 1/1373 414/273 |
| 7,110,855 B2 | * | 9/2006 | Leishman ........... | G06Q 10/087 700/214 |
| 8,644,983 B1 | * | 2/2014 | Barua .................... | G06Q 10/08 700/216 |
| 2006/0041329 A1 | * | 2/2006 | Lucas ................... | G06Q 10/06 700/214 |
| 2006/0142895 A1 | * | 6/2006 | Waddington ...... | G06F 17/30902 700/216 |
| 2007/0043468 A1 | * | 2/2007 | Schaefer ............. | B65G 1/1373 700/216 |
| 2008/0215179 A1 | * | 9/2008 | Yair ..................... | G06Q 10/087 700/215 |
| 2010/0036521 A1 | * | 2/2010 | Schafer ............... | B65G 1/1378 700/216 |
| 2010/0241269 A1 | * | 9/2010 | Ham ................ | G06Q 10/06315 700/214 |

(Continued)

*Primary Examiner* — Patrick Cicchino
(74) *Attorney, Agent, or Firm* — Sheridan Ross P.C.

(57) ABSTRACT

A method and system for order fulfillment is disclosed. In one embodiment, the order fulfillment system aggregates and consolidates the picking of products in a wave picking process, followed by a consolidated sortation system to enable automatic sorting of picked items by order.

18 Claims, 9 Drawing Sheets

(56) References Cited

U.S. PATENT DOCUMENTS

2013/0317642 A1* 11/2013 Asaria .................... G06Q 50/28
  700/216
2013/0338819 A1* 12/2013 Max ....................... B65G 1/137
  700/216
2014/0136255 A1* 5/2014 Grabovski ..... G06Q 10/063114
  705/7.14

* cited by examiner

METHOD AND SYSTEM FOR ORDER FULFILLMENT

CROSS REFERENCE TO RELATED APPLICATIONS

The present application claims the benefits of and priority, under 35 U.S.C. §119(e), to U.S. Provisional Application Ser. No. 61/985,957, filed on Apr. 29, 2014, entitled "Automated Solution for Apple Order Fulfillment Operation" and U.S. Provisional Application Ser. No. 62/028,191, filed on Jul. 23, 2014, entitled "Method and System for Order Fulfillment." The entire disclosures of the applications listed above are hereby incorporated by reference, in their entirety, for all that they teach and for all purposes.

FIELD OF THE INVENTION

The disclosure relates generally to order fulfillment and particularly to order fulfillment in a warehouse environment.

SUMMARY OF THE INVENTION

The disclosure relates to a method and system for order fulfillment in a warehouse environment. The order fulfillment system disclosed aggregates and consolidates the picking of products in a wave picking process, followed by a consolidated sortation system to enable automatic sorting of picked items by order.

Traditional order fulfillment systems pick items for each order individually, leading to inefficiencies and delay, especially when involving high volume orders. Some efforts have been made to optimize one area or component of order fulfillment, e.g. the pick process itself, but do not synthesize nor coordinate the entire order fulfillment process, i.e. from customer order, picking, packing, customizing as required, and shipping. An order fulfillment system that optimizes one isolated area tends to produce bottlenecks in other areas, thereby mitigating if not removing any efficiency gains in the overall system. For example a faster picking or product delivery solution without a corresponding improvement in processing or shipping could potentially result in order accumulation at processing and/or shipping and do little in delivering optimal overall efficiency and scalability. The disclosure provides a system and method that ensures that each component operates in a fully coordinated way, providing a balanced and controlled end to end order fulfillment system and avoiding the creation of bottlenecks in any one area of the process.

There is a long-felt need for a system and method that avoids the problems, challenges and inefficiencies of traditional order fulfillment systems. The disclosure addresses these needs by providing a system and method that ensures that each component operates in a fully coordinated way, providing a balanced and controlled end to end order fulfillment system and avoiding the creation of bottlenecks in any one area of the process. In one embodiment, an order fulfillment system is disclosed which aggregates and consolidates the picking of products in a wave picking process, followed by a consolidated sortation system to enable automatic sorting of picked items by order. Also, while the disclosure is presented in terms of exemplary and optional embodiments, it should be appreciated that individual aspects of the disclosure can be separately claimed.

Several benefits ensue from efficiencies achieved by use of the disclosed method and system. These benefits include a reduction in labor costs, improved price competitiveness, increased flexibility to manage peaks and troughs of business (customer) requirements, reduced training for temporary staff (such as those required during holiday order fulfillment surges), and reduced incremental or marginal costs for order fulfillment volume spikes.

In one embodiment, a method of fulfilling a customer order request is provided, the method comprising: receiving a customer request to fulfill a plurality of orders, wherein each order comprises one or more parts; storing the customer request; de-consolidating the customer request wherein the one or more parts of each of the plurality of orders are de-consolidated from the respective order; grouping the one or more parts of each of the plurality of orders into picking waves; directing an equipment subsystem to pick the picking waves; and fulfilling the customer order.

In another embodiment, a system to fulfill a customer order request is disclosed, the system comprising: a warehouse management system configured to: receive a customer request to fulfill a plurality of orders, wherein each order comprises one or more parts; store the customer request; de-consolidate the customer request wherein the one or more parts of each of the plurality of orders are de-consolidated from the respective order; group the one or more parts of each of the plurality of orders into picking waves; and create a picking wave directive; and an equipment subsystem configured to fulfill a plurality of orders, the equipment subsystem configured to: receive a picking wave directive from a warehouse management system; and fulfill the customer order.

Embodiments include a non-transitory computer readable medium having instructions stored thereon that, when executed by a processor, perform operations comprising the above methods. Embodiments include a device, means, and/or system configured to perform the above methods. In order to provide additional disclosure, the following documents are incorporated by reference in entirety for all purposes: U.S. Pat. No. 7,370,005 to Ham et al. issued May 6, 2008; U.S. Pat. No. 7,389,249 to Hsu et al. issued Jun. 17, 2008; U.S. Pat. No. 7,860,750 to Hunter et al., issued Dec. 28, 2010; U.S. Pat. No. 7,984,809 to Ramey et al., issued Jul. 26, 2011; U.S. Pat. No. 8,256,353 to Howell issued Sep. 4, 2012; U.S. Patent Application Publication No. 2010/0030668 to Paben published Feb. 4, 2010; U.S. Patent Application Publication No. 2012/0030067 to Pothukuchi et al. published Feb. 2, 2012; U.S. Patent Application Publication No. 2014/0136255 to Grabovski et al. published May 15, 2014; U.S. Patent Application Publication No. 2014/0172620 to Kumar Somayajula et al. published Jun. 19, 2014; and PCT Application No. WO 2010/118386 A1 to Robinson et al. published Oct. 14, 2010.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "carrier" refers to a shipping carrier, such as FedEx™, US Postal Service™, DHL™ and UPS™.

The term "DC" refers to a distribution center, to include a warehouse.

The term "DM" refers to data matrix.

The term "EDI" refers to Electronic Data Interchange.

The term "MPN" refers to a manufacturer part number.

The term "RTM" refers to route to market.

The term "RTM channel" refers to a route to market channel, such as a logistical channel.

The term "SKD" refers to stock keeping identifier.

The term "SKU" refers to stock keeping unit.

The term "UPH" refers to units per hour.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "bus" and variations thereof, as used herein, refers to a subsystem that transfers information and/or data between various components. A bus generally refers to the collection communication hardware interface, interconnects, bus architecture, and/or protocol defining the communication scheme for a communication system and/or communication network. A bus may also be specifically refer to a part of a communication hardware that interfaces the communication hardware with the interconnects that connect to other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

A "communication channel" refers to an analog and/or digital physical transmission medium such as cable (twisted-pair wire, cable, and fiber-optic cable) and/or other wireline transmission medium, and/or a logical and/or virtual connection over a multiplexed medium, such microwave, satellite, radio, infrared, or other wireless transmission medium. A communication channel is used to convey an information signal, for example a digital bit stream, from one or several senders (or transmitters) to one or several receivers. A communication channel has a certain capacity for transmitting information, often measured by its bandwidth in Hz or its data rate in bits per second. Communication channel performance measures that can be employed in determining a quality or grade of service of a selected channel include spectral bandwidth in Hertz, symbol rate in baud, pulses/s or symbols/s, digital bandwidth bit/s measures (e.g., gross bit rate (signaling rate), net bit rate (information rate), channel capacity, and maximum throughput), channel utilization, link spectral efficiency, signal-to-noise ratio measures (e.g., signal-to-interference ratio, Eb/No, and carrier-to-interference ratio in decibel), bit-error rate (BER), packet-error rate (PER), latency in seconds, propagation time, transmission time, and delay jitter.

The terms "communication device," "smartphone," and "mobile device," and variations thereof, as used herein, are used interchangeably and include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

A "communication modality" refers to a protocol- or standard defined or specific communication session or interaction, such as Voice-Over-Internet-Protocol ("VoIP"), cellular communications (e.g., IS-95, 1G, 2G, 3G, 3.5G, 4G, 4G/IMT-Advanced standards, 3GPP, WIMAX™, GSM, CDMA, CDMA2000, EDGE, 1×EVDO, iDEN, GPRS, HSPDA, TDMA, UMA, UMTS, ITU-R, and 5G), Bluetooth™, text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or MSN Messenger™, Wireclub, Xfire, and Yahoo! Messenger™), email, Twitter (e.g., tweeting), Digital Service Protocol (DSP), and the like.

The term "communication system" or "communication network" and variations thereof, as used herein, refers to a collection of communication components capable of one or more of transmission, relay, interconnect, control, or otherwise manipulate information or data from at least one transmitter to at least one receiver. As such, the communication may include a range of systems supporting point-to-point to broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine", "calculate" and "compute," and variations thereof, as used herein, are used interchangeably and include any type of methodology, process, mathematical operation or technique.

The term "display" refers to a portion of a screen used to display the output of a computer to a user.

The term "displayed image" or "displayed object" refers to an image produced on the display. A typical displayed image is a window or desktop or portion thereof, such as an icon. The displayed image may occupy all or a portion of the display.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "in communication with," as used herein, refers to any coupling, connection, or interaction using electrical signals to exchange information or data, using any system, hardware, software, protocol, or format, regardless of whether the exchange occurs wirelessly or over a wired connection.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates. The touch screen may or may not include a proximity sensor to sense a nearness of object, such as a user digit, to the screen.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference letter or label.

DETAILED DESCRIPTION

Presented herein are embodiments of systems, devices, processes, data structures, user interfaces, etc. The embodiments may relate to a method and system for order fulfillment in a warehouse environment. However, other embodiments contemplated include applications associated with inventory control and manufacturing control, e.g. lean manufacturing or inventory control, and just in time manufacturing or inventory control. Furthermore, the systems can relate to communications systems and/or devices and may be capable of communicating with other devices and/or to an individual or group of individuals, machines or devices. In one embodiment, a warehouse management system (e.g. the ATLAS™ warehouse management system) and its associated software systems interacts with a hardware and equipment subsystem (and its associated software subsystems to, e.g., drive the system hardware).

Figure 1:
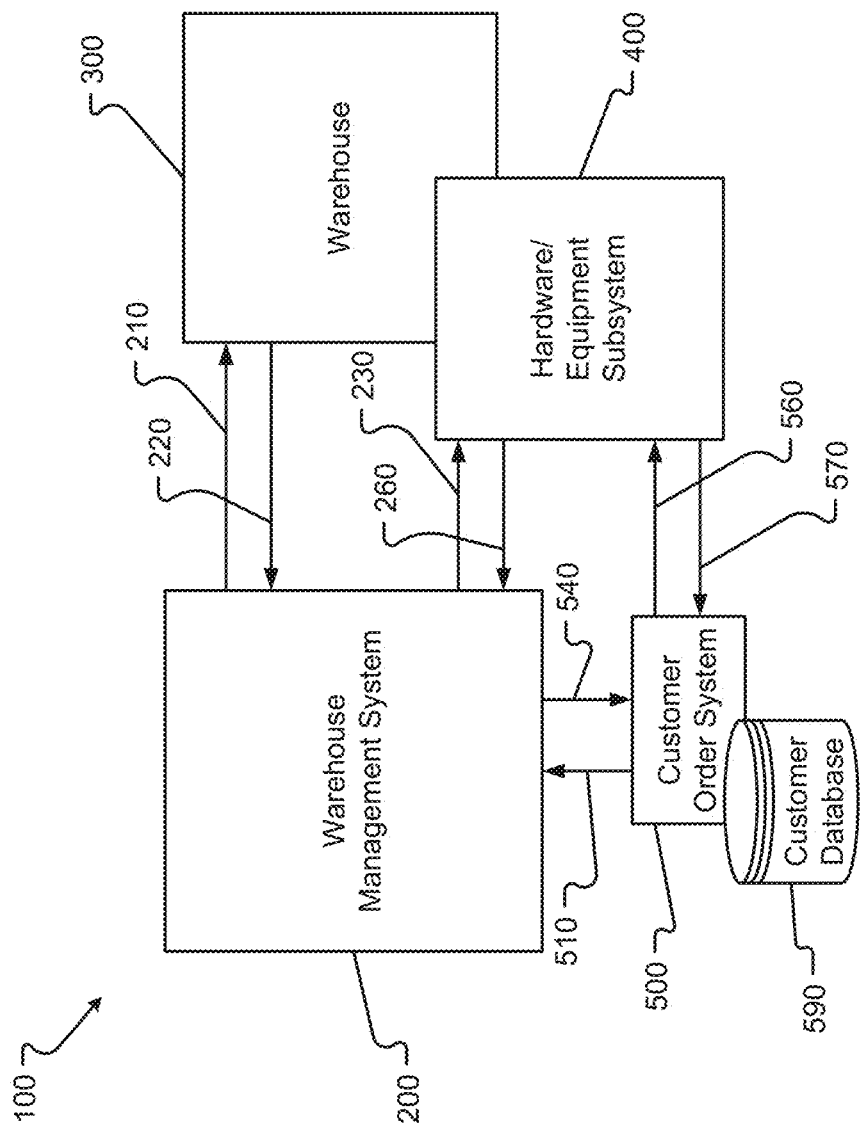
FIG. 1 depicts an embodiment of an order fulfillment system.

An order fulfillment system 100 comprising a warehouse management system 200, warehouse 300, hardware/equipment subsystem ("H/E S") 400, and customer order system 500 comprising customer database 590 is shown in FIG. 1. The components of the order fulfillment system 100 interconnect via data inputs/outputs as shown in FIG. 1 and described in more detail in FIGS. 2 and 3. In one embodiment, one or more of the data input/output interfaces are EDI.

Generally, one or more customer orders from the customer order system 500 is output 510 to and received by warehouse management system 200, such as in the form of data structure 511. Customer order system 500 comprises a customer database 590, such as, but limited in any way to, a relational database and/or relational database management system (RDMS) which in one embodiment comprises SAP™, AS/400™, and Oracle. The warehouse management system 200 outputs and/or queries customer order system 500 by output 540 to and received by customer order system 500. The warehouse management system 200 may update the customer order system, such as a customer SAP system, with information concerning a particular order or group of orders via data stream 540. In one embodiment, the warehouse management system 200 may query the hardware/equipment subsystem 400 for status or similar data (via data stream 230) regarding an order or orders wherein a status is returned (via data stream 260) which may then be used to update the customer order system 500 (via data stream 540) and/or the customer database 590.

In one embodiment, the order fulfillment system 100 is configured such that no modification is required to the interfaces, such as data I/O interfaces of 540 and 510, between the customer order system 500 and the warehouse management system 200. For example, no new or altered I/O interfaces are required between an existing customer order system 500 such as a customer SAP™ system and a warehouse management system such as ATLAS™.

The warehouse management system 200 de-consolidates the customer order data into part numbers for each particular order and, in consideration of other customer orders, determines pick tasks and associated wave picking instructions to output to the hardware/equipment subsystem 400. The output data from the warehouse management system 200 to the hardware/equipment subsystem 400 is shown as element 230 such as in the form of data structure 231. Output from the hardware/equipment subsystem 400 to the warehouse management system 200 is shown as element 260. The hardware/equipment subsystem 400 decodes the data stream 230 received from the warehouse management system 200 into operator and system instructions to complete the operations processes in the warehouse 300 distribution center, to include: release of orders in waves, consolidation of picking by part number, material handling to the appropriate process step (e.g. de-trash, price labeling, etching and gifting), order re-consolidation and packing, and parcel sortation to the appropriate carrier sort lane. The above wave picking solution followed by a consolidated sortation process creates increased flexibility relative to conventional order fulfillment systems.

The warehouse management system 200 communicates with the warehouse 300 via respective output 210 and input 220. Among other things, the data exchange between these components allows warehouse configuration management, to include placement and apportionment of warehouse products, such as by faster vs. slower-moving MPNs. For example, the warehouse management system 200 determines fast, medium and slow moving MPN's via analysis and/or historic profiling and then determines product positioning throughout the warehouse 300 for maximum efficiency. Location utilization and MPN throughput rates may be regularly evaluated by the warehouse management system 200 to determine replenishment tasks throughout the warehouse 300, determine or adjust pick faces and generally dictate warehouse configuration to optimize the order fulfillment system 100.

In one embodiment, the super-fast mover items are stored in racks down a single picking aisle. An automated belt conveyor is run down the center of this fast pick aisle, and available orders (e.g. retail, dotcom, RTM channel) are consolidated into bulk pick tasks by MPN. As such, conventional prioritizing by order release and picking at order level by RTM or by carrier sortation/truck lane is no longer required in this design. Instead, pick tasks are released to operators in waves in the most efficient pick sequence by parameters comprising zone, location, SKID and MPN quantity, for example, or other parameters associated with a customer order as known to those skilled in the art.

The warehouse 300 may be fitted with one or more sensors to provide warehouse state data to the warehouse management system via data stream 220. For example, an accident may damage stock and/or damage a rack. Such an accident may occur in a particular area or zone of the warehouse and further may be sensed by an image sensor, vibration sensor, and/or acoustic sensor (or other known to one skilled in the art). The accident may retard or adjust picking in that particular zone, such as the amount of picking. By sending such sensor data from the warehouse 300 sensor to the warehouse management system 200, the picking quantity of the warehouse management system 200 could be adjusted or influenced, e.g. to temporarily reduce picking in the particular accident area.

The customer order system 500 communicates with the hardware/equipment subsystem 400 via respective output 560 and input 570. Among other things, such communications allow the customer order system to obtain status of a particular order and/or query the hardware/equipment subsystem 400 for such status.

Figure 2:
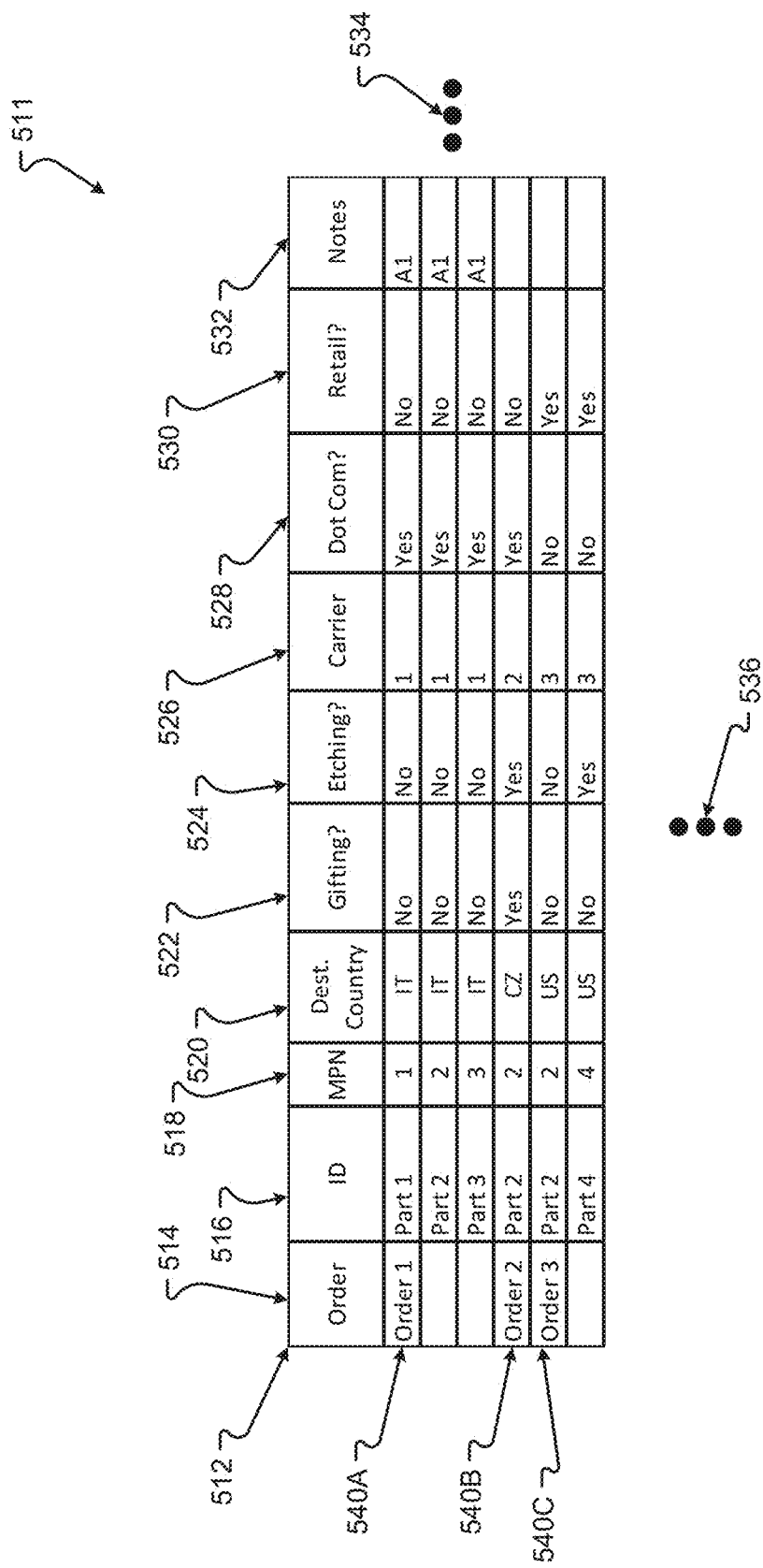
FIG. 2 is a diagram of an embodiment of a data structure for storing information about customer orders.

FIG. 2 provides an embodiment of data structure 511 to store different settings. The data structure is used to transfer data between the customer order system 500 and the warehouse management system 200, e.g. as data output 510 of FIG. 1. The data structure 511 may include one or more of data files or data objects 512. The data structure 511 may be electronic data interchange (EDI). Thus, the data structure 511 may represent different types of databases or data storage, for example, object-oriented data bases, flat file data structures, relational database, or other types of data storage arrangements. Embodiments of the data structure 511 disclosed herein may be separate, combined, and/or distributed. As indicated in FIG. 2, there may be more or fewer portions in the data structure 511, as represented by ellipses 534. Further, there may be more or fewer files in the data structure 511, as represented by ellipses 536.

Referring to FIG. 2, a first data structure 511 is shown. The data file 512 may include several portions 514-532 representing different types of data. Each of these types of data may be associated with an order, as shown in portion 514.

There may be one or more order records 540 and associated data stored within the data file 512. As provided herein, the customer order may be any order within the order fulfillment system 100. The order may be identified in portion 516. A particular order may comprise one or more parts (where a "part" is a unique item, e.g. a cellphone, or an extra battery pack). In FIG. 2, order 1 comprises three parts, i.e. parts 1, 2 and 3, whereas order 2 comprises only one part, i.e. part 2, and order 3 comprises two parts, i.e. parts 2 and 4. Each part has an associated MPN identified in portion 518, and a destination country identified in portion 520. Further, each part within each order (i.e., orders 540A, 540B and 540C) is associated with requirements of gifting 522 and etching 524. For example, order 1 (540A) requires no etching and no gifting (e.g. wrapping of the part in gift wrapping paper) of any of parts 1, 2 and 3. However, order 2 (540B) requires both gifting and etching of its single part order, i.e. to part 2. Lastly, order 3 (540C) requires no gifting and no wrapping for part 2 but requires etching for part 4. The shipping carrier for each order is identified in portion 526, and the type of customer placing the order identified as either an internet (i.e. dotcom) customer in portion 528 or a retail customer in portion 530. Finally, a notes column 532 may identify special handling and/or priority of a particular customer. For example, perhaps business requirements dictate that a particular customer receive expedited order fulfillment for a particular period of time. Such higher priority may be identified in portion 532 (here, order 1 (540A) is designated A1 which may be used as input into various algorithms used by the order fulfillment system 100 and/or warehouse management system 200 to direct the H/E S400 in order fulfillment. Such a scenario might arise when a contract renewal is being negotiated with a particular large-volume customer where a drop in order fulfillment performance would be particular noticeable and/or harmful to the order fulfillment party.

Additional information corresponding to customer generating orders may be stored in the customer database 590 of FIG. 1, i.e. customer specific requirements. For example, the customer database 590 may include data relating to at least one of current data, historical data, a customer preference, customer habit, customer routine, observation, location data (e.g., programmed and/or requested destinations, locations of parking, routes traveled, average driving time, etc.), social media connections, contacts, brand recognition, audible recording data, text data, email data, preferred retail locations/sites (e.g., physical locations, web-based locations, etc.), recent purchases, behavior associated with the aforementioned data, and the like.

Figure 3:
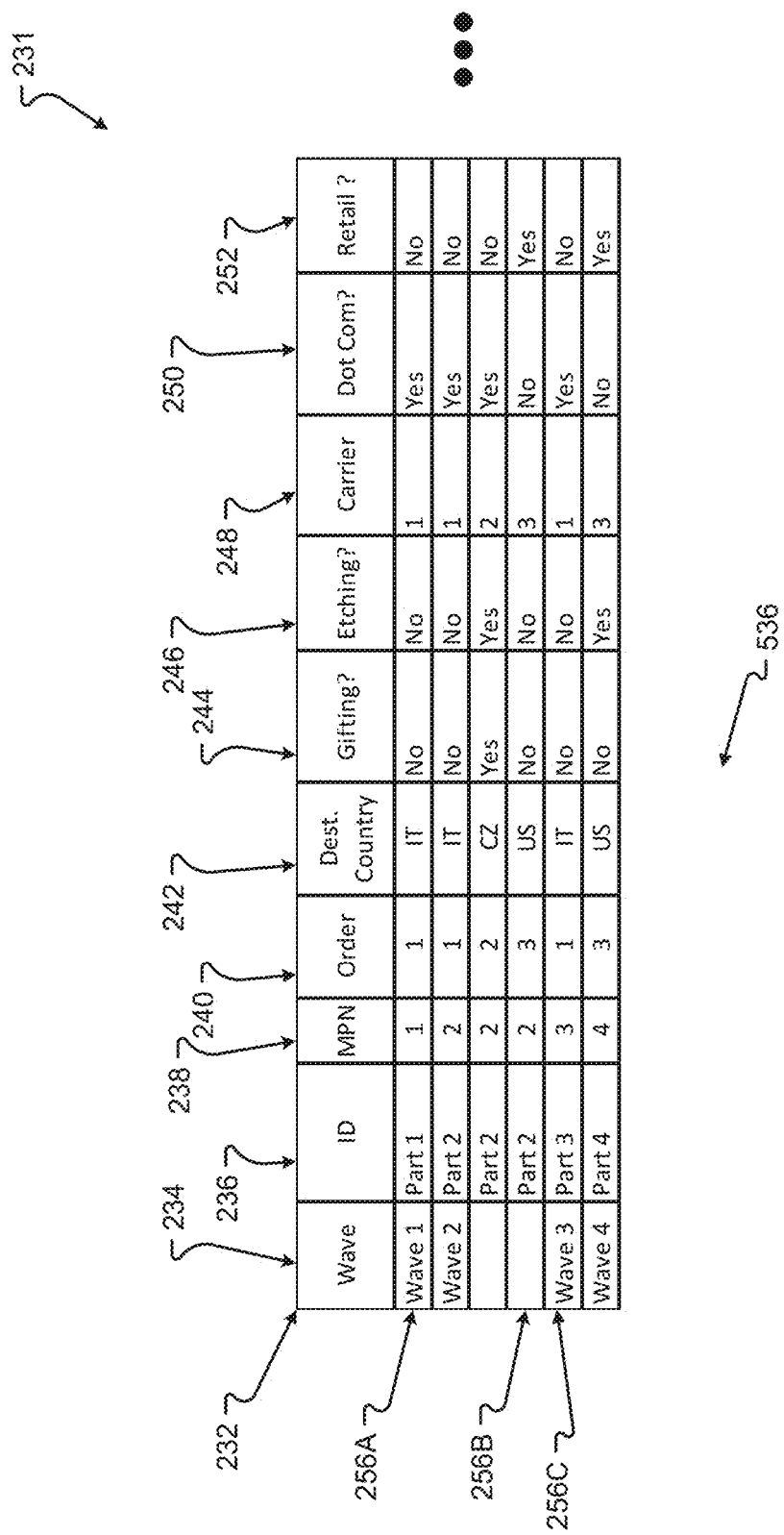
FIG. 3 is a diagram of an embodiment of a data structure for storing information about order fulfillment.

Referring to FIG. 3, a second data structure 231 is shown. The data file 232 may include several portions 234-252 representing different types of data. Each of these types of data may be associated with a wave picking instruction, as shown in portion 234. FIG. 3 is intended to represent one embodiment of a warehouse management system algorithm or process that accepts a plurality of customer orders (via data file 511 of the representative data of FIG. 2) and creates a wave picking instruction (via data file 231 of the representative data of FIG. 2 as re-arranged for FIG. 3).

There may be one or more wave records 256 and associated data stored within the data file 232. As provided herein, the wave data may be any order within the order fulfillment system 100. A wave may be identified in portion 234. A particular wave may comprise one or more customer orders 240 yet consist of one, i.e. the same, part 236 (where a "part" is a unique item, e.g. a cellphone, or an extra battery pack). In FIG. 3, wave 2 comprises three orders 240, i.e. orders 1, 2 and 3, all for part 2, whereas each of wave 1, 3 and 4 comprises only one customer order for respective parts 1, 3 and 4. Each part 236 has an associated MPN identified in portion 238, and a destination country identified in portion 242. Further, each part within each order is associated with requirements of gifting 544 and etching 246. For example, order 1 requires no etching and no gifting (e.g. wrapping of the part in gift wrapping paper) of any of parts 1, 2 and 3. However, order 2 requires both gifting and etching of its single part order, i.e. to part 2. Lastly, order 3 requires no gifting and no wrapping for part 2 but requires etching for part 4. The shipping carrier for each order is identified in portion 248, and the type of customer placing the order identified as either an internet (i.e. dotcom) customer in portion 250 or a retail customer in portion 252.

Figure 4:
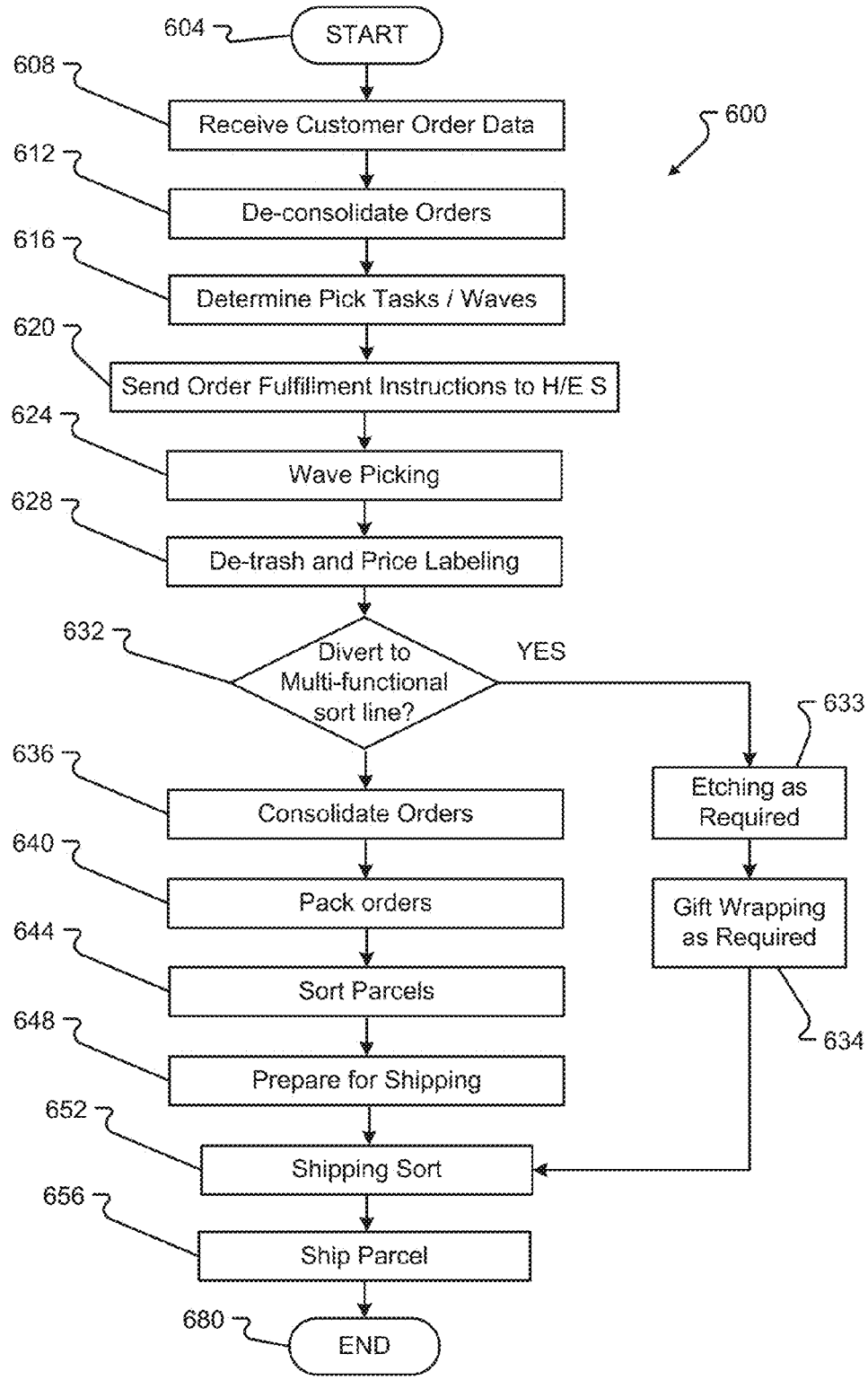
FIG. 4 is a flow or process diagram of one embodiment of a method for fulfilling orders.

An embodiment of a method 600 for fulfilling orders is shown in FIG. 4. While a general order for the steps of the method 600 is shown in FIG. 4, the method 600 can include more or fewer steps or can arrange the order of the steps differently than those shown in FIG. 4. Generally, the method 600 starts with a start operation 604 and ends with an end operation 680. The method 600 can be executed as a set of computer-executable instructions executed by a computer system and encoded or stored on a computer readable medium. Hereinafter, the method 600 shall be explained with reference to the systems, components, modules, software, data structures, user interfaces, etc. described in conjunction with FIGS. 1-3 and 5-9.

At step 608, the warehouse management system 200 receives customer order data via input 510 from the customer order system 500, comprising orders from retail, dotcom and RTM channel. In one embodiment, the input 510 is the data file 512 of FIG. 2. The warehouse management system 200 may alternatively receive customer orders from a plurality of customer entities, i.e. the customer order system 500 may be a plurality of customer order systems, and may comprise retail orders and dotcom/internet orders.

At step 612, the warehouse management system 200 de-consolidates the customer order data. That is, the parts or components of each order are deconstructed so as to allow bundling of parts by a particular attribute, such as MPN. Stated another way, all available orders (based on released criteria) are de-consolidated to a part level where the warehouse management system 200 then determines the most efficient pick tasks required to fulfill the orders. As such, the customer order data for a particular customer may be combined with customer order data for other customers or orders for the same customer may be combined. Here, a "customer" refers to a product producer or supplier, which provides a plurality of orders from end users, where end users may comprise those users who will or have purchased the product via retail outlets and dotcom/internet sources. In one embodiment, the warehouse management system 200 employs a relational database system and may include SAP™ software and/or a structured query language (SQL) server.

At step 616, the warehouse management system 200 determines pick tasks into pick waves. Using the de-constructed customer data as provided from step 612, the warehouse management system 200 determines wave picking instructions by way of a picking algorithm. The picking algorithm considers order and/or part attributes comprising type and/or volume of MPN, RTM, warehouse layout zone of parts, location of parts and/or operators such as pickers, carrier sort, destination country, prioritization of customer and/or order types and/or part types, SKID and MPN quantity, order deliver prioritization, and customer business needs or requirements (such as priority of a particular part over all others). Each attribute may be assigned a user adjustable weighing value thereby allowing the picking algorithm to be tuned, adjusted or altered, either manually or automatically.

For example, the picking logic could avoid certain warehouse zones if it is determined (e.g. through receipt of warehouse state data via 220) that an accident has occurred at a certain warehouse zone thereby drastically lowering or stopping picking throughput or picking ability at a certain zone. Similarly, if a packing problem is identified and/or sensed, the warehouse management system may delay the release of one or more subsequent waves. As such, the picking algorithm uses feedback control with respect to warehouse state to influence the picking instructions provided by the picking algorithm. Similarly, the picking logic may receive state data as to certain components and/or areas of the hardware/equipment subsystem which may influence the picking algorithm. For example, a blockage or failure in one or more bins of the order consolidation area 740 may serve to redirect the picking algorithm to increase use of the multi-function area 720. In one embodiment, the picking algorithm determines the most efficient consolidation of tasks and pick routes for the picker. In one embodiment, the picking algorithm consolidates and prioritizes the release of orders by one or more of RTM, Carrier sort and departure schedule. In one embodiment, the picking waves are directed to be performed in a defined sequence. In one embodiment, the sequence of the picking waves is not defined. In one embodiment, the picking algorithm considers warehouse 300 and/or H/E S 400 employee head count, employee position, and/or load availability to influence or determine the release of wave picking activity until all picks for each wave have been completed. In one embodiment, the wave picking can consolidate retail, dotcom and RTM channel picks for maximum efficiency or be managed separately for specific day requirements (i.e. NSO and/or NPI events).

The picking algorithm of the warehouse management system 200 thus drives the H/E S 400 to differentiate and prioritize order release to the operators so as to facilitate any number of additional or value add service levels that a customer may offer to their end-users, such as pre 10 am deliveries and/or timed deliveries.

Thus, conventional prioritizing by order release and picking at order level by RTM or by carrier sortation/truck lane is no longer required in this design. Instead, pick tasks are released to operators in waves in the most efficient pick sequence by parameters comprising zone, location, SKID and MPN quantity, for example, or other parameters associated with a customer order as known to those skilled in the art.

At step 620, the warehouse management system 200 sends order fulfillment instructions, to include the pick tasks as determined at step 616, to the hardware/equipment subsystem 400. The hardware/equipment subsystem 400 provides various acknowledgements, comprising parts physically received, allocation of parts for de-trash, price labelling areas and allocation of sort lanes for reconsolidation of units to orders At step 624, the hardware/equipment subsystem executes a consolidated wave picking of the parts as directed by the instructions provided by the warehouse management system 200. Each wave of picks allows operators to pick multiple items for multiple orders comprising retail, dotcom, RTM channel in one journey through allocated aisles.

In one embodiment, all picking operators will use RF handheld terminals that will direct them sequentially to the correct pick locations. The warehouse 300 layout will be optimized to ensure that up to date warehouse management system 200 throughput rates per MPN are reflected in the physical pick face/warehouse layout. Once at the pick location the operator can either scan the SKID (as is typically done in conventional picking systems) or alternatively scan each product barcode to verify correct pick prior to picking the required quantity for the part number. The picker worker places items directly onto the belt conveyor with the product barcode in a readable position. Once all items have been confirmed picked, operator is directed to his next pick task by the RF handheld terminal. This method allows the operator to pick multiple items for multiple orders simultaneously for retail and dotcom in one journey, minimizing walk time and maximizing efficiency.

The pick face layout further improves efficiencies. In one embodiment, the pick face aisle will be single rack either side to allow replenishment from behind. Flow racking at ground level could be installed where appropriate for higher density of SKU's and faster picking UPH. At the end of the picking conveyor the barcode scanning system uses state of the art automatic image-based camera technology rather than conventional line scanners. The image based cameras can simultaneously capture multiple barcodes in 1D, 2D and Data Matrix (QR) formats and are capable of scanning barcodes as small as 20 mm in length and 2 mm in height. In one embodiment, all serial number and/or UPC barcodes for all products may be scanned and captured, thereby allowing any or all MPN serial numbers to be sent to the customer order system 500 via data stream 540 for updating of customer order system 500 and/or customer database 590, such as a SAP customer database.

In one embodiment, the faster moving items are positioned within the first four pallet locations of each aisle closest to the conveyor for maximum efficiency, each picker will operate within two allocated aisles. The medium and slow-moving items are picked by operator trolley. That is, an operator picks the correct number of products to a trolley and moves to the next location. Once the operator reaches the end of each aisle or the maximum volume for the trolley, all items that have been picked are placed onto the belt conveyor running along the back wall at the right angle to the fast pick conveyor for product delivery to the sort zone. Operators must ensure that the units are placed on the conveyor with the barcode in a readable position (any side of the unit/carton except underneath) by the camera. Operators do not need to consider products being positioned too close together as metering belts ensure correct spacing of all products on the conveyor in advance of their reaching of the first scan point. As long as the barcode is in a readable position and undamaged, there will be zero "no reads".

In the event of any picking discrepancy (over-pick, mispick, damaged barcodes) then the product will be diverted to the nearest reject station for manual intervention. The reject station is positioned at the end of the order consolidation line.

All product barcodes are automatically scanned before reaching the first divert point. In the case of masterpacks where the units are required for either dotcom or retail orders, these too are diverted along this line. Once diverted, the product barcode is automatically scanned again for step 628 logic.

In one embodiment, touch devices are used by picking operators at each chute and/or sort line to instruct the packing operator, such as completion of an order (i.e. an order has been filled), or that a large-size item, too big to fit in a chute, must be added to complete the order. The touch device is an operator prompted order picking system used to streamline the order fulfillment process. It uses WiFi to interface applications to drive real time picking waves. One touch device can point to several pick locations by illuminating the direction or pointing to the carton or bin the item is to be picked from. By using a wireless device, mobility, changes in operation, pick locations, etc. becomes a complete non-issue as opposed to fixed mounted lights and wiring used in conventional pick-to-light applications. Touch picking may be associated with a small number of SKUs that have a large amount of picks per SKU, although it can be used in large sized installations with a large SKU count. Touch picking is typically used in product areas with a medium to high turnover, and may be combined with radio frequency (RF) system in order to cover areas with lower turnover. Just as touch methods can be used for picking, put to light refers to "putting" items into cartons or totes in batches. A picking cart with several boxes or totes will indicate where to put each item as it is picked or in a consolidation/pack station there may be a series of open cartons with associated lights to indicate picked items placement.

Figure 5:
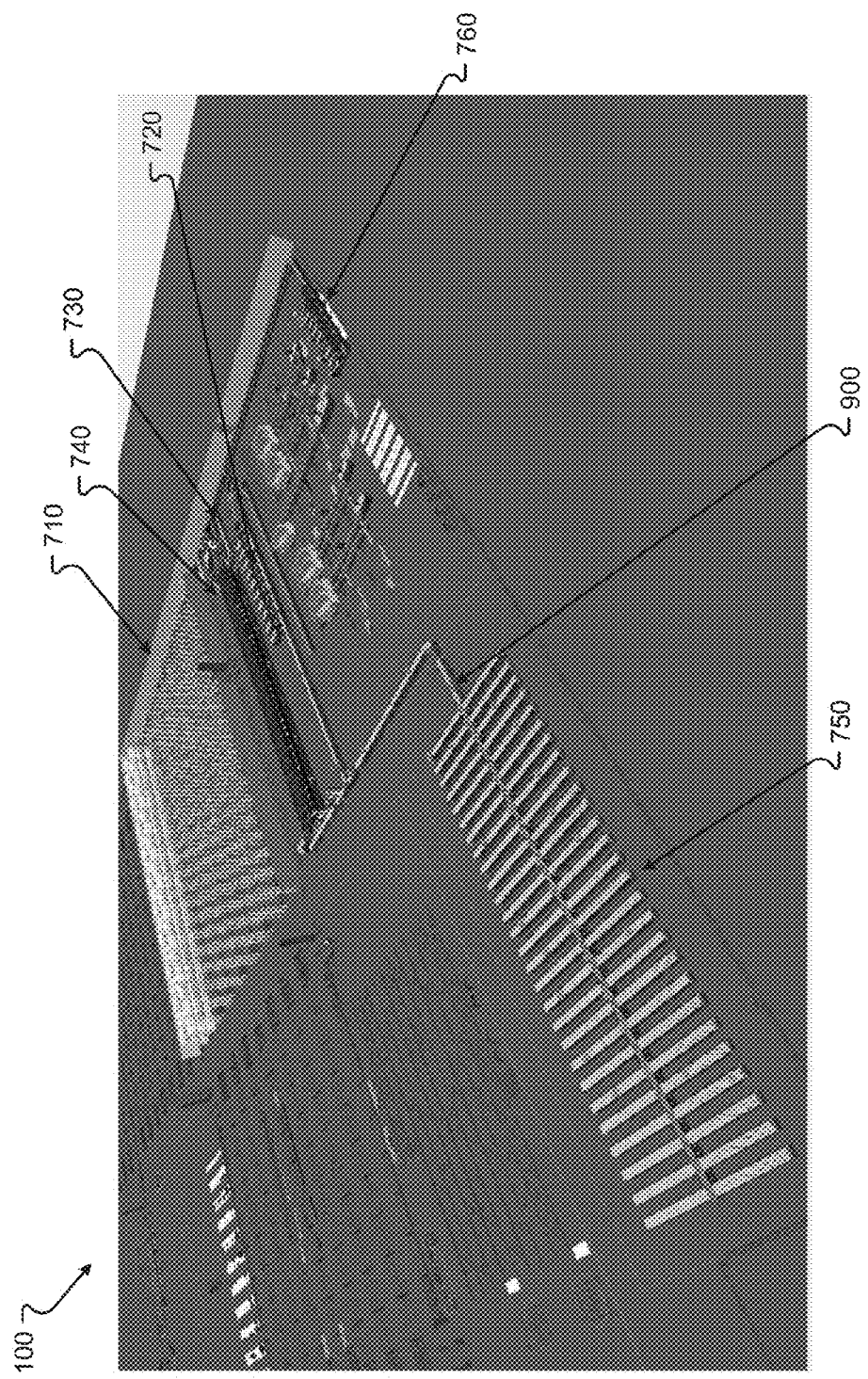
FIG. 5 depicts an embodiment of an order fulfillment system.
Figure 6:
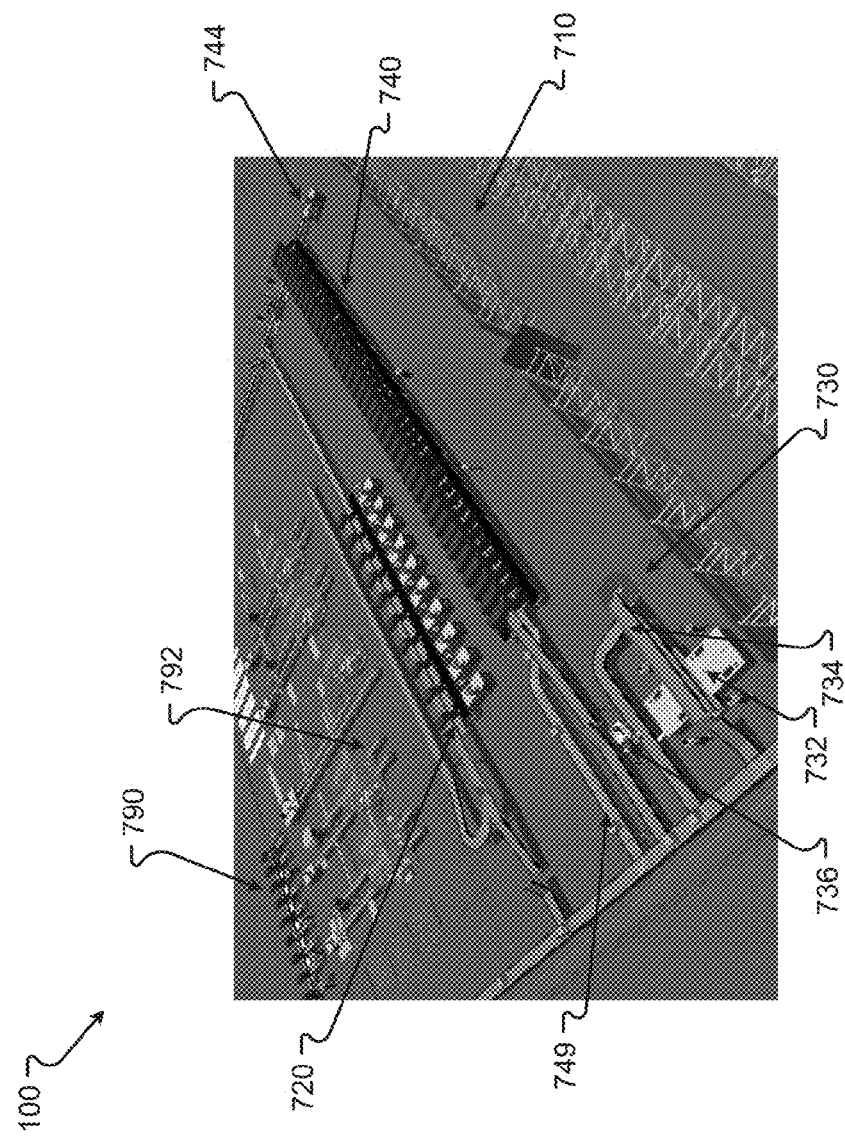
FIG. 6 depicts a close-up view of elements of the embodiment of the order fulfillment system of FIG. 5.

All picked cartons, master packs and units will pass through a Hardware/Equipment Subsystem 400 vision based camera scanner capable of simultaneously capturing all UPC/EAN 1D, 2D and Data Matrix codes. This data (unit level) at this point will become associated with the corresponding order, which will determine its route through order fulfilment to carrier sortation. All bar code data will be stored in the warehouse management system and transmitted to customer order system 500 as required for dotcom orders. The picking area 710 in one embodiment is depicted in FIGS. 5 and 6.

At step 628, the hardware/equipment subsystem performs de-trashing and price labeling as required. The de-trash and price labelling area 730 in one embodiment is depicted in FIGS. 5 and 6, comprising de-trash stations 732, waste conveyor 734, and automatic price labeller 736. The warehouse management system 200 provides unit/part number detail as well as pricing data to the hardware/equipment subsystem 400 to enable accurate allocation of cartons to be de-trashed and units required for country specific price labelling. The product barcode is automatically scanned again to determine if the product requires: de-trash (as may be required for dotcom and retail order), price labeling (as may be required for retail orders), de-trash and price labeling (as may be required for retail orders), and etching accessories (as may be required for retail and dotcom orders). In one embodiment, there are four dedicated stations for operators to de-trash from masterpack and place the units back on the conveyor belt. In other embodiments, more than four or less than four dedicated stations for operators to de-trash from masterpack and place the units back on the conveyor belt are provided.

Products (masterpacks and units) are delivered to the de-trash and price labelling area 730 on the lower conveyor and operators place the de-trashed items onto the middle level waste conveyor for forwarding to the order consolidation line, multi-functional line 720 or the etching sorter area 760. A highest level waste conveyor 734 is a dedicated raised conveyor for the disposal of waste boxes. Post de-trash the product barcodes will be scanned and the retail price label will be automatically applied (if required) by the automatic price labeller 736 before the product is re-merged at order level at the order consolidation line 740.

The automatic price labeller 736 will apply labels to the precise location (in one embodiment, within 0.5 mm tolerance) on the unit per specific Part Number and can manage labels to, in one embodiment, a minimum size of 10 millimeters. In one embodiment, labeling may perform at approximately 4,140 labels per hour, and de-trash may perform at 900 units per station per hour.

The units to be de-trashed comprise: all accessories requested in retail DN's, all accessories MPs that are related to dotcom orders that require loose units, and all DN's that require at least one etching or gifting unit with accessories. Units not needing to be de-trashed comprise shippable units such as computer displays, personal computers such as an iMac1 , laptops and masterpacks.

Figure 9:
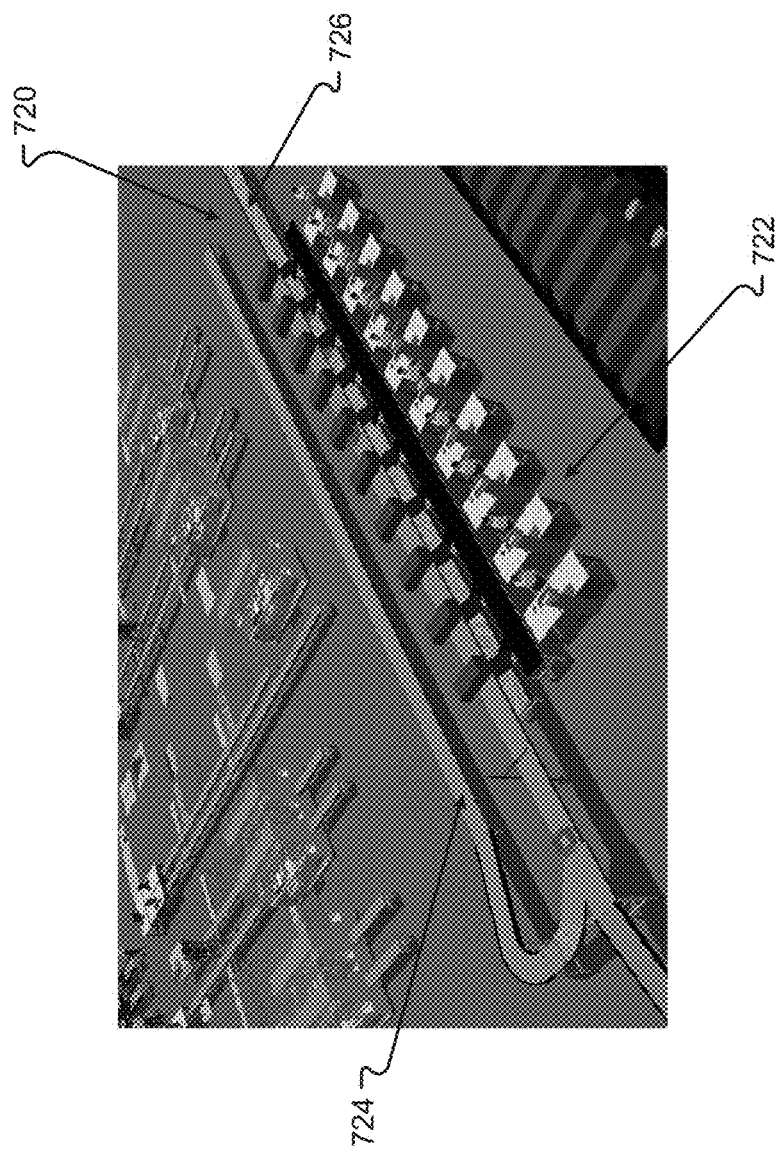
FIG. 9 depicts a close-up view of the multi-functional line portions of the embodiment of the order fulfillment system of FIG. 5.

At step 632, the hardware/equipment subsystem 400 performs a query to determine if a picked part should be diverted to a multi-functional sort line area 720. The multi-functional sort line area 720 in one embodiment is depicted in FIGS. 5, 6 and 9 comprising stations for gift-wrapping completion 722 as required, a conveyor 724 to receive completed etched orders for dotcom orders, and take-away conveyor 726. The multi-functional sort line area 720 performs processing of dotcom single item orders requiring special boxes, single line shippable cartons, etching and gifting orders. Arriving product barcodes are scanned and again tracked down this sortation conveyor and product is sorted by order to, in one embodiment, one of ten pack stations. The operator packs product (if required), prints delivery note (if required), seals box and applies shipping label. Each pack station of the multi-functional sort line area 720 is equipped with (similar to that of the order consolidation line 740 discussed below in detail) a fixed mount scanner (akin to element 744 in FIG. 8), delivery note and shipping label printer (akin to element 742 of FIG. 8), user interactive screen eg a touch screen (akin to element 746 of FIG. 8), and an overhead camera. The operator places packed items onto the takeaway conveyor 726 running underneath the sortation conveyor 724. Takeaway conveyor will then re-merge with the conveyor feeding into the ship sorter.

At step 633, etching is performed as required. Products requiring etching will be sorted by order to, in one embodiment, one of nine sort points. Etching order sorting is depicted as element 790 in FIG. 6. Unit(s) to be etched will be sorted and merged with their accessory/accessories prior to release for etching. Using the same order completion functionality as the order consolidation line area 740, all units for a complete order are released to ensure full order completion and safeguard against any product mix error. At the end of the etching lines (shown as element 792 in FIG. 6) completed etching orders are injected onto the conveyor 724 for gift wrapping (if required) and further processing.

At step 634, gift wrapping is performed as required. An operator first gift wraps and the packs product (if required), prints delivery note (if required), seals box and applies shipping label. Each pack station is equipped with a fixed mount scanner, delivery note and shipping label printer, as described above. As with the order consolidation line area 740 each station is equipped with a touch-screen display and an overhead camera. In the embodiment at FIG. 4, after completing step 634 the method 600 continues to step 652. Alternatively, after completing step 634, the method 600 continues to step 648.

At step 636, the hardware/equipment subsystem re-consolidates orders. The order consolidation sort area 740 in one embodiment is depicted in FIGS. 5-8 comprising a fixed mount scanner 744, delivery note and shipping label printer 742 and user interactive screen e.g. a touch screen 746 e.g. an iTouch™, and an overhead camera. Each sort line comprises scanner 744 and screen 746. In one embodiment, the scanner 744 is an overhead camera.

Generally, in the order consolidation sort area 740 all units picked, de-trashed and price labelled for each wave are assigned to an order specific sort lane on the order consolidation line. It is at this point that units are re-consolidated to the order level. Scans of each unit at pack out are verified by the warehouse management system 200 confirming all required units for each order have been processed. A unique DN-linked barcode tag is assigned to each re-pack carton processed as a licence plate to facilitate tracking through to the next process stage. The sortation system of the order consolidation sort area 740 allows the combining of orders into a wave based on the number of sortation lanes. The orders can be grouped in a way to, in one embodiment, maximize the number of like SKU numbers that are in a wave. The sorter can be configured to allow the fulfilment of orders based on order type. Single item orders can be sorted to dedicated lanes that are equipped to pack single items. This allows for a special process that can be optimized to quickly pack and fulfil single orders. Lanes can also be configured based on order size or even orders containing specific items that might require special packing Orders that have more than one item can also be assigned to dedicated lanes to allow the consolidation of the order items for packing Thus, once the items have been sorted to the lane the operator can then manually pack the items then immediately freeing the lane for next order.

In the order consolidation sort of the order consolidation sort area 740, each sort line is assigned for individual orders, the units for which accumulate on that line until order is complete. The product is then scanned at the start of the sortation conveyor to determine which sort line each product is to be diverted to. Each product is automatically tracked along the sortation conveyor and diverted to the correct line. A floating operator is responsible for keeping pack stations replenished with re-pack boxes. This operator will apply a license plate barcode to the empty box (this will marry the box barcode to the order) and scan the pack location before placing the units to complete the order into the box and inserting dunnage. The operator knows when all units required to complete an order are in the sort line tray as each station is equipped with an interactive display computer, e.g. an iPad™ such as the CASI iTouch which will light green to highlight when the order is complete and ready for pack out. The delivery note is also printed and scanned at the appropriate sort line to ensure the correct product is married to the correct carton and delivery note. The interactive display computer can also be programmed to instruct the operator on which repack box to use and in which sequence the units should be placed for optimal carton stability and to minimize any risk of unit damage while in transit. Each sort lane is equipped with an overhead camera which will photograph each unit as it is packed out. The order consolidation sort can also be programmed to allocate any quantity of sort lanes for specific products or re-pack box sizes. Individual units are scanned using an image-based "pass over" scanner/camera to the shipping carton ID ensuring order integrity and providing quality verification processes. The carton is then placed onto the takeaway conveyor to the next stage where the carton is automatically closed, taped and shipping label applied for forwarding to the ship sorter.

Figure 7:
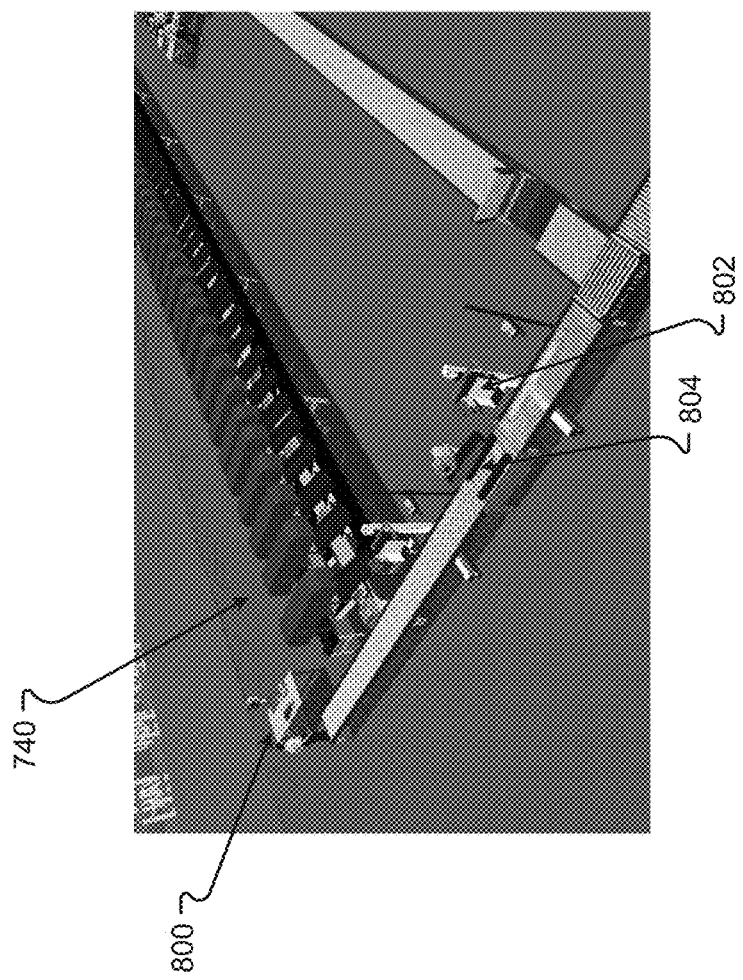
FIG. 7 depicts another close-up view of elements of the embodiment of the order fulfillment system of FIG. 5.
Figure 8:
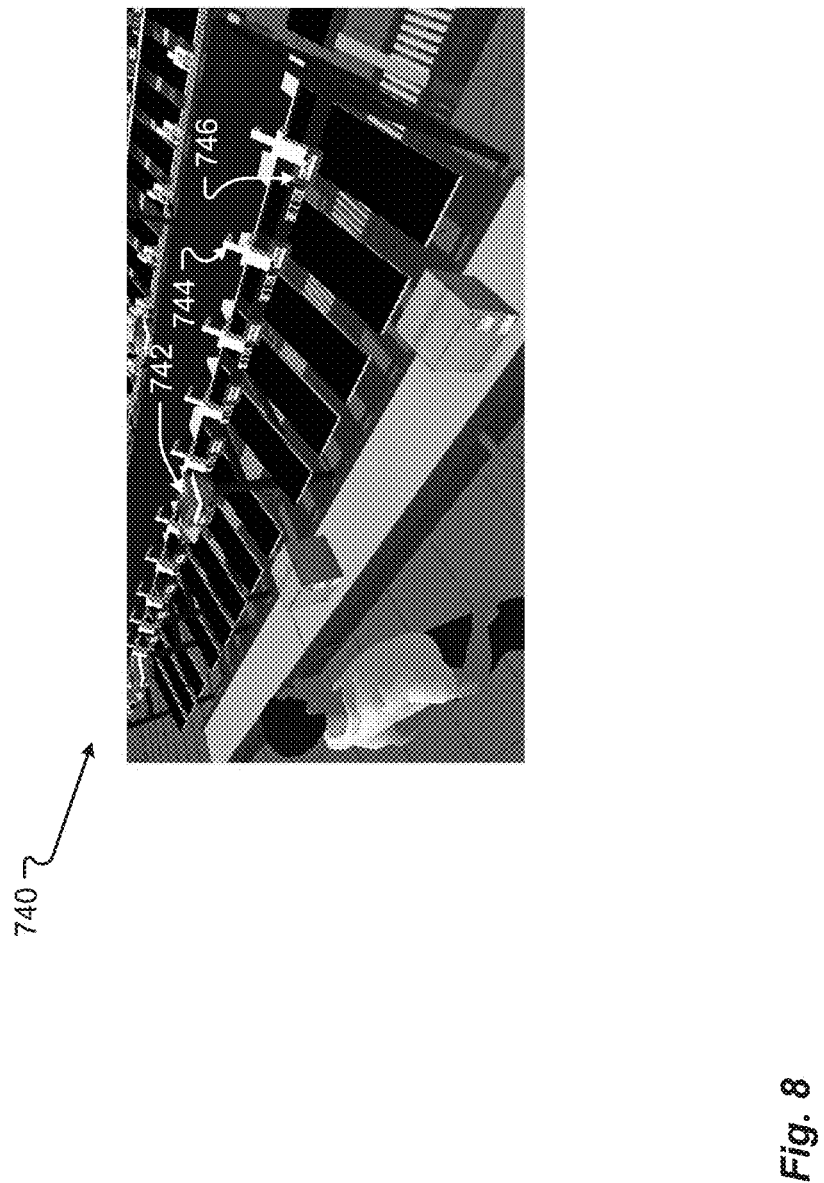
FIG. 8 depicts yet another close-up view of elements of the embodiment of the order fulfillment system of FIG. 5.

In one embodiment, the order consolidation sort of the order consolidation sort area 740 has shipping capacity as follows: shipping label printer/applicator: 28,800 per day (8 hours shift); box sealer machine: 28,800 per day (8 hours shift). Over-sized items (piano keyboards, large printers, guitars etc.) are injected at the of the Order Consolidation Sort, i.e. at element 800 as shown in FIG. 7.

Orders containing either full masterpack quantities and/or shippable cartons (laptops, printers, iPads™, iPods™) can also be picked to belt and automatically diverted to the pass through line 749 for labeling and delivery note attachment (when required) if it is a single carton/masterpack order; if not the delivery note is inserted into one of the other repack cartons of the order. Note that in the case of retail orders, where no shipping label or delivery note is required to attach to the carton, these can travel directly to the ship sorter.

At step 640, the hardware/equipment subsystem 400 packs the orders, and at step 644, the hardware/equipment subsystem 400 sorts parcels. Note that the warehouse management system 200 assigns the correct carton specific shipping label to its corresponding box based on DN and carton data (post processing.) Completed boxes on the take away conveyor travel through a 90 degree bend where the barcode on the box is scanned, the box sealed and the shipping label printed and applied. The applied shipping label is verified by another scan before moving on to the ship sorter of step 652. FIG. 7 depicts the over-sized item injection point 800, box sealer 802 and shipping label printer and applicator 804.

At step 652, the hardware/equipment subsystem performs a shipping sort. The shipping sorter will be configured (automatically by the warehouse management system 200 or manually by an operator team leader) to reflect all required truck lanes and carrier sortations, as determined by the warehouse management system 200 using the carrier determination matrix table. The carrier sortation data as printed on each shipping label will direct each carton to its corresponding shipping pallet/pallet ID.

Boxes and cartons (completed orders) are conveyed to the shipping sorter. Prior to entering the sortation conveyor, the shipping label barcode is scanned and the product is weighed. If the recorded weight does not match the expected weight for the order (within tolerance), then carton can be diverted to the reject station at the end of the sortation line to be checked and order quarantined. The ship sorter scan will also determine which specific dedicated carrier sortation lane the carton is to be sorted. The boxes are tracked down the sortation conveyor and diverted to the correct sortation lane for palletisation and shipping. Sortation Lanes are flexible and can be assigned and edited at any time by the authorized management personnel in order to ensure maximum flexibility.

In one embodiment, the ship sorter has a total of 54 individual sortation lanes; 27 of these (one side) can be dedicated to the retail stores and the remaining 27 would accommodate all remaining dotcom carrier sortations. Expansion can be accommodated with the addition of a second tier of sortation lanes.

The hardware/equipment subsystem 400 will automatically check the weight of each carton (at element 900 depicted in FIG. 5) on route to the ship sorter; these data will be held at order level in the warehouse management system 200 DN file for comparison purpose and transmission to customer order system 500 if required.

At step 656, the hardware/equipment subsystem ships the parcels. At step 680, the method 600 ends.

In one embodiment, the hardware/equipment subsystem 200 comprises the following elements. A CASI core controller which integrates and controls several functions, such as sortation, labeling, weighing, conveyor controls,shipping systems, and other WCS applications may be employed. A CASI SortMaster™ 150 Electric Sorter may be used. Also, a CASI SortMaster™ 24 Volt DC Bi-Directional Divert and/or CASI 961 In-Motion Check-weigher may be used.

Further, the CASI SolidLabel™ system may be employed for automatic labeling, verification and package distribution, and/or to control the flow and handling of cartons for labeling. Also, the CASI SolidShip™ system for automatic labeling, verification and package distribution, and/or to control the flow and handling of parcels through the labeling and manifesting process prior to shipping/sortation may be used, and/or the CASI SolidRoute™ for automatic sortation, routing and merge control, tracking and acknowledgement, and performance diagnostics and reports necessary to maintain a high volume operation, and/or the SolidVerify™ software module used to match inputs, e.g. matching a shipping label with the pick label, matching a barcode label with a vision input and ensuring that only one SKU is passing by a read point. Lastly, a CASI SolidComm™ interface tool may be utilized for Legacy Host Interface. The SolidComm™ module uses a variety of communication methodologies, including ASCII, FTP, XML, Message Tables, ODBC, ADO or Socket Connection. Automatic reconnect capability is provided if the host connection is interrupted. Supported host platforms include IBM mainframes, AS400, UNIX, DOS and Microsoft Windows.

The exemplary systems and methods of this disclosure have been described in relation to order fulfillment in a warehouse environment and associated devices. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Corte™-M processors, ARM® Cortex-A and ARM926EJ-S™ processors, other industry-equivalent processors, and may perform computational functions using any known or future-developed standard, instruction set, libraries, and/or architecture.

Performance Analysis

In some embodiments, the capacity of the order fulfillment system 100 is driven by the multi-item orders. The system capacity is calculated by taking the multi-item orders and dividing them by the number of lanes on the sorter.

A day wherein there were approximately 3451 multi-item orders was analyzed as follows. This required 52 waves of picking to fulfil. Every time the wave picking was performed a large number of single items orders were also picked. The amount of picking operators can be calculated by the number of unique items picked per wave. This would represent the act of an operator having to move between locations to pick items. The number of each unique SKU would then represent the amount of time spent at that location to pick the required quantity. The amount of time required for picking each wave can be the calculated to determine the number of pickers required to pick the required volume. The sum of all the picking times calculated based on the waves for this day was 124, 754 seconds of picking Based on the fact an FTE equates to 7.25 effective working hours, the sum of all picking times equates to 17,207 seconds of picking per hour. If an operator can work for 3600 seconds an hour then the number of pickers required is approximately 5.

The number of packers required can be calculated in a similar way. The amount of time it takes to pack a single item can be used to determine the total number of packers dedicated to single items. Based on the data for this day it would require approximately 6 full time single item order packers. The same calculation can be applied for multi-item orders using the same logic as that applied to picking To process the first item of an order would take a certain amount of time. However, to process the additional items of the same order would take significantly less time as the operator is already at the lane. Our calculation resulted in 2 full time packers to handle all 3451 multi-item orders.

Scalability is a natural characteristic of this system. In other words the system only needs to use as many lanes as the volume of any one day requires. Adding or reducing labor allows the system to immediately increase or decrease capacity as the business requires.

The process of prioritising and sequencing the release of orders and creating waves further facilitates the completion of orders in lines with different Carrier departure and Cut-Off times. This aspect of the system is easily programmed to suit the requirements of any one day and is ideal in the event of unexpected order drops or late changes to the day's priorities. Each team leader or authorized person can be equipped with a Wi-Fi enabled touch screen thereby allowing him or her the ability to reconfigure the system immediately from wherever they are in the building or even remotely if necessary.

The day at bar also required approximately 11,885 units to be de-trashed and price labelled across all RTM and processes. Within the 11 hour day that is approximately 1080 items per hour. This allows more than 3 seconds per item for auto price labelling, but the auto price labelling can maintain a steady rate of 70 items per minute or 4200 items per hour that means a utilization rate at peak of 25%.

What is claimed is:

1. A method of fulfilling at least one customer order request, the method comprising:
   receiving, by a warehouse management system managing inventory in a warehouse, at least one customer request to fulfill a plurality of orders, wherein each order comprises one or more parts;
   storing, by the warehouse management system, the customer request;
   de-consolidating, by the warehouse management system, the customer request into the one or more parts of each of the plurality of orders;
   grouping, by the warehouse management system, the one or more parts of each of the plurality of orders into picking waves based on at least one attribute associated with the one or more parts, wherein the picking waves are sequentially ordered;
   directing, by the warehouse management system, a hardware/equipment subsystem to pick the picking waves from inventory within the warehouse based on the sequential ordering;
   providing the picked parts to an order consolidation sort area;
   a fixed mount scanner scanning a barcode to identify each of the picked parts;
   based on the barcode, the warehouse management system automatically sending each of the picked parts to one of a plurality of sort lines, wherein each sort line comprises a second scanner that verifies the picked part provided to the sort line is part of an order associated with the part, wherein each sort line fulfills one of the plurality orders; and
   automatically moving, via a conveyor belt associated with the sort line, the picked part to a packing station to pack the picked part into a box with at least one other picked part to fulfill the order.

2. The method of claim 1, wherein at least one picking wave comprises one or more parts from a plurality of orders.

3. The method of claim 1, wherein the picking waves are influenced by attributes of the plurality of orders, wherein the attributes comprise route to market (RTM) and manufacturer part number (MPN).

4. The method of claim 1, wherein the picking waves are influenced by a state of an environment where the one or more parts of each order are located.

5. The method of claim 1, wherein the picking waves comprise a sequence of picking waves.

6. The method of claim 5, wherein the directing step further comprises picking the picking waves in the sequence of picking waves.

7. The method of claim 1, wherein the one or more parts are stored in a warehouse.

8. The method of claim 7, wherein the warehouse comprises one or more sensors that provide state data of one or more areas of the warehouse housing the one or more parts, the state data influencing the grouping step.

9. The method of claim 1, wherein the equipment subsystem comprises one or more sensors that provide state data of one or more areas of the warehouse housing the one or more parts used to fulfill the customer request, the state data influencing the grouping step.

10. A system to fulfill at least one a customer order request, the system comprising:
    a warehouse management system configured to:
       manage inventory within a warehouse;
       receive a customer request to fulfill a plurality of orders, wherein each order comprises one or more parts;
       store the customer request;
       de-consolidate the customer request into one or more parts of each of the plurality of orders from the respective order;
       group the one or more parts of each of the plurality of orders into picking waves based on at least one attribute associated with the one or more parts, wherein the picking waves are sequentially ordered; and
       create a picking wave directive to send to an equipment subsystem, wherein the picking wave picks parts from inventory within the warehouse based on the sequential ordering; and
    an equipment subsystem configured to fulfill a plurality of orders, the equipment subsystem configured to:
       receive a picking wave directive from the warehouse management system to pick parts from inventory within the warehouse based on the sequential ordering;
       providing the picked parts to an order consolidation sort area;
       a fixed mount scanner scanning a barcode to identify each of the picked parts;
       based on the barcode, the warehouse management system automatically sending each of the picked parts to one of a plurality of sort lines, wherein each sort line comprises a second scanner that verifies the picked part provided to the sort line is part of an order associated with the part, wherein each sort line fulfills one of the plurality orders; and
       automatically moving, via a conveyor belt associated with the sort line, the picked part to a packing station to pack the picked part into a box with at least one other picked part to fulfill the order.

11. The system of claim 10, wherein at least one picking wave comprises one or more parts from a plurality of orders.

12. The system of claim 10, wherein the picking waves are influenced by attributes of the plurality of orders, wherein the attributes comprise route to market (RTM) and manufacturer part number (MPN).

13. The system of claim 10, wherein the picking waves are influenced by a state of an environment where the one or more parts of each order are located.

14. The system of claim 10, wherein the picking waves comprise a sequence of picking waves.

15. The system of claim 14, wherein the picking waves are a sequence of picking waves.

16. The system of claim 10, wherein the one or more parts are stored in a warehouse.

17. The system of claim 16, wherein the warehouse comprises one or more sensors that provide state data of one or more areas of the warehouse housing the one or more parts, the state data influencing the grouping step.

18. The system of claim 10, wherein the equipment subsystem comprises one or more sensors that provide a state data of one or more areas of the warehouse housing the one or more parts, the state data influencing the grouping step.

* * * * *